United States Patent
Iwasaki et al.

(10) Patent No.: US 9,443,645 B2
(45) Date of Patent: Sep. 13, 2016

(54) INSULATED WIRE FOR VEHICLE USE AND CABLE FOR VEHICLE USE

(71) Applicant: Hitachi Cable, Ltd., Tokyo (JP)

(72) Inventors: Makoto Iwasaki, Hitachi (JP); Kentaro Segawa, Hitachi (JP); Hitoshi Kimura, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 434 days.

(21) Appl. No.: 13/916,520

(22) Filed: Jun. 12, 2013

(65) Prior Publication Data

US 2014/0011028 A1 Jan. 9, 2014

(30) Foreign Application Priority Data

Jul. 3, 2012 (JP) .................. 2012-149237

(51) Int. Cl.
*H01B 7/00* (2006.01)
*H01B 3/30* (2006.01)
(Continued)

(52) U.S. Cl.
CPC .................. *H01B 7/295* (2013.01); *C08K 3/22* (2013.01); *C08K 5/14* (2013.01); *C08K 5/5425* (2013.01); *H01B 3/441* (2013.01); *H01B 3/448* (2013.01);
(Continued)

(58) Field of Classification Search
CPC ........... H01B 3/44–3/448; C08K 5/54–5/549; C08K 5/14; C08K 3/22; C08K 2003/2203–2003/2275
USPC ........................................... 174/110 R–110 E
See application file for complete search history.

(56) References Cited

U.S. PATENT DOCUMENTS 6,596,392 B1 7/2003 Tanaka et al.
6,924,334 B1 * 8/2005 Fukatani .................. C08K 7/00
501/145

(Continued)

FOREIGN PATENT DOCUMENTS

| JP | H 10-208552 A | 8/1998 |
| JP | 2002-042574 A | 2/2002 |
| JP | 2010-097881 A | 4/2010 |

OTHER PUBLICATIONS

Dagley, I. "An Evaluation of Ethylene-Vinyl Acetate Copolymers as Desensitizers for RDX in Insensitive Booster Compositions Prepared by the Slurry Coating Technique", DSTO Materials Research Laboratory, Materials Research Laboratory 1989. pp. 7-10.*

(Continued)

*Primary Examiner* — Jennifer Chriss
*Assistant Examiner* — Frank Vineis
(74) *Attorney, Agent, or Firm* — McGinn IP Law Group, PLLC

(57) ABSTRACT

An insulated wire for vehicle use includes a conductor and an insulating layer disposed on an outer circumference of the conductor. The insulating layer comprises a halogen-free flame retardant cross-linkable resin composition containing a base polymer, and a silane coupling agent and a metal hydroxide which are added to the base polymer. The base polymer includes, as major components, (a) an ethylene-vinyl acetate copolymer (EVA) and (b) an acid-modified olefin resin having a Tg of $-55°$ C. or lower at a ratio (a):(b) of 70:30 to 100:0 and has an acetic acid content (VA) of 50% to 70% by mass. The silane-coupling agent is added in an amount of 1 to 5 parts by mass and the metal hydroxide is added in an amount of 100 to 250 parts by mass relative to 100 parts by mass of the base polymer.

17 Claims, 1 Drawing Sheet

(51) Int. Cl.
  *H01B 3/44* (2006.01)
  *B32B 27/00* (2006.01)
  *H01B 7/295* (2006.01)
  *C08K 3/22* (2006.01)
  *C08K 5/14* (2006.01)
  *C08K 5/5425* (2006.01)

(52) U.S. Cl.
  CPC .......... *C08K 2003/2224* (2013.01); *C08K 2003/2227* (2013.01); *Y10T 428/2947* (2015.01); *Y10T 428/2958* (2015.01)

(56) References Cited

U.S. PATENT DOCUMENTS

| 2002/0033272 | A1* | 3/2002 | Hashimoto | H01B 3/441 174/137 B |
| 2009/0020311 | A1 | 1/2009 | Park et al. | |
| 2011/0049436 | A1* | 3/2011 | Aoyama | H01B 1/24 252/511 |
| 2011/0209898 | A1* | 9/2011 | Kibe | H01B 7/2806 174/113 R |
| 2013/0251927 | A1* | 9/2013 | Kouno | C08L 23/02 428/35.7 |

OTHER PUBLICATIONS

Japanese Office Action dated Jun. 23, 2015 with an English translation thereof.
Chinese Office Action dated Mar. 2, 2016 and English Translation thereof.
Japanese Office Action dated Feb. 23, 2016 and English Translation thereof.
Japanese Notification of Reason for Refusal.
Chinese Notification of Reason for Refusal.
Chinese Office Action dated Jul. 4, 2016 with an English translation thereof.

* cited by examiner

INSULATED WIRE FOR VEHICLE USE AND CABLE FOR VEHICLE USE

The present application is based on Japanese patent application No. 2012-149237 filed on Jul. 3, 2012, the entire contents of which are incorporated herein by reference.

BACKGROUND OF THE INVENTION

1. Field of the Invention

The present invention relates to an insulated wire for vehicle use and a cable for vehicle use and, in particular, the invention relates to an insulated wire for vehicle use and a cable for vehicle use each having flame retardance and having high oil resistance and an excellent low-temperature property (flexibility at low temperatures).

2. Description of the Related Art

Awareness of environmental issues has been growing worldwide, and there has been an increased demand for halogen-free materials which do not generate halogen gas at the time of combustion. Furthermore, in order to obtain high flame retardance by preventing flames from spreading at the time of a fire, it is necessary to add a large amount of a halogen-free flame retardant, such as a metal hydroxide (for example, refer to Japanese Unexamined Patent Application Publication No. 2010-97881).

However, addition of a large amount of a halogen-free flame retardant will degrade mechanical properties and also degrade a melt flow characteristic, thus limiting the range of usable forming machines.

On the other hand, insulated wires and cables used for vehicles, such as rolling stocks, automobiles, and robots, are required to have high oil resistance and a low-temperature property depending on the usage environment.

It is known that high oil resistance can be obtained by using polymers having high crystallinity or polymers having high polarity, and that a low-temperature property can be obtained by using materials having a low glass transition temperature (Tg).

However, in the case where polymers having high crystallinity are used in order to obtain high oil resistance, flexibility decreases, and wiring performance degrades when applied to insulated wires and cables.

Furthermore, a high VA content ethylene-vinyl acetate copolymer (EVA) having an acetic acid content (VA) of 50% by mass or more, which is an example of a polymer having high polarity, has excellent oil resistance while maintaining flexibility at normal temperature. However, it has a high Tg and a poor low-temperature property.

SUMMARY OF THE INVENTION

In view of the foregoing and other exemplary problems, drawbacks, and disadvantages of the conventional methods and structures, and an exemplary feature of the present invention is to provide an insulated wire for vehicle use and cable for vehicle use. It is an object of the present invention to provide an insulated wire for vehicle use and a cable for vehicle use each having flame retardance and having high oil resistance and an excellent low-temperature property (flexibility at low temperatures).

In order to achieve the object described above, the present invention provides the following insulated wire for vehicle use and cable for vehicle use.

[1] According to one exemplary aspect of the invention, an insulated wire for vehicle use includes a conductor and an insulating layer disposed on an outer circumference of the conductor, in which the insulating layer is includes a halogen-free flame retardant cross-linkable resin composition including a base polymer, and a silane coupling agent and a metal hydroxide which are added to the base polymer, the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass, the silane-coupling agent is added in an amount of 1 to 5 parts by mass relative to 100 parts by mass of the base polymer, and the metal hydroxide is added in an amount of 100 to 250 parts by mass relative to 100 parts by mass of the base polymer.

[2] In the above exemplary invention [1], many exemplary modifications and changes can be made as below (the following exemplary modifications and changes can be made). In the insulated wire for vehicle use according to the item [1], the EVA may include two or more types of EVAs and may include 5% to 10% by mass of an EVA having a melt flow rate (MFR) of 15 g/10 min or more.

[3] According to another exemplary aspect of the invention, a cable for vehicle use includes a conductor, an insulating layer disposed on an outer circumference of the conductor, and a sheath disposed on an outer circumference of the insulating layer, in which the sheath includes a halogen-free flame retardant cross-linkable resin composition including a base polymer, and a silane coupling agent and a metal hydroxide which are added to the base polymer, the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass, the silane-coupling agent is added in an amount of 1 to 5 parts by mass relative to 100 parts by mass of the base polymer, and the metal hydroxide is added in an amount of 100 to 250 parts by mass relative to 100 parts by mass of the base polymer.

[4] In the cable for vehicle use according to the item [3], the EVA may include two or more types of EVAs and may include 5% to 10% by mass of an EVA having a melt flow rate (MFR) of 15 g/10 min or more.

The above exemplary modifications may be alone or in any combination thereof. according to an exemplary aspect of the present invention, it may be possible to provide an insulated wire for vehicle use and a cable for vehicle use each having flame retardance and having high oil resistance and an excellent low-temperature property (flexibility at low temperatures).

BRIEF DESCRIPTION OF THE DRAWINGS

The foregoing and other exemplary purposes, aspects and advantages will be better understood from the following detailed description of the invention with reference to the drawings, in which.

DESCRIPTION OF THE EXEMPLARY EMBODIMENTS

Figure 1:
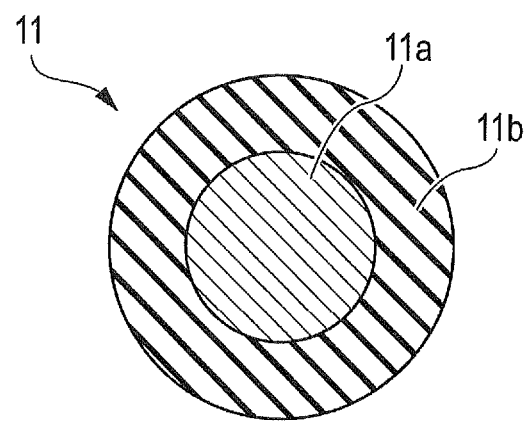
FIG. 1 is a cross-sectional view of an embodiment of an insulated wire for vehicle use according to an exemplary aspect of the present invention.
Figure 2:
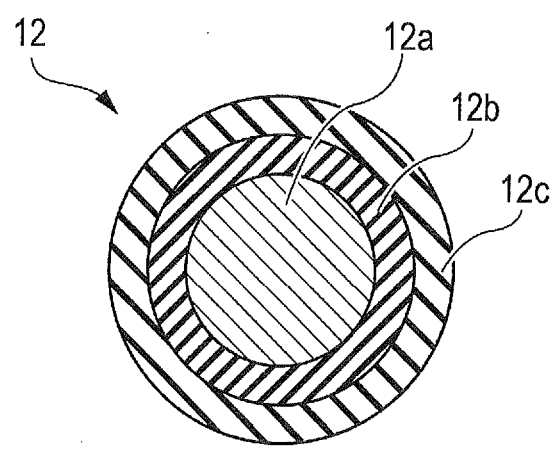
FIG. 2 is a cross-sectional view of an embodiment of a cable for vehicle use according to an exemplary aspect of the present invention.

Referring now to the drawings, and more particularly to FIGS. 1-2, there are shown exemplary embodiments of the methods and structures according to the present invention.

Although the invention has been described with respect to specific exemplary embodiments for complete an clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

An insulated wire for vehicle use according to an embodiment of the present invention includes a conductor and an insulating layer disposed on an outer circumference of the conductor, in which the insulating layer includes a halogen-free flame retardant cross-linkable resin composition including a base polymer, and a silane coupling agent and a metal hydroxide which are added to the base polymer, the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass, the silane-coupling agent is added in an amount of 1 to 5 parts by mass relative to 100 parts by mass of the base polymer, and the metal hydroxide is added in an amount of 100 to 250 parts by mass relative to 100 parts by mass of the base polymer.

A cable for vehicle use according to an embodiment of the present invention includes a conductor, an insulating layer disposed on an outer circumference of the conductor, and a sheath disposed on an outer circumference of the insulating layer, in which the sheath includes a halogen-free flame retardant cross-linkable resin composition including a base polymer, and a silane coupling agent and a metal hydroxide which are added to the base polymer, the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass; the silane-coupling agent is added in an amount of 1 to 5 parts by mass relative to 100 parts by mass of the base polymer; and the metal hydroxide is added in an amount of 100 to 250 parts by mass relative to 100 parts by mass of the base polymer.

The embodiments of an insulated wire for vehicle use and a cable for vehicle use according to the present invention will be specifically described with reference to the drawings.

(Insulated Wire for Vehicle Use)

FIG. 1 is a cross-sectional view of an embodiment of an insulated wire for vehicle use according to an exemplary aspect of the present invention.

As shown in FIG. 1, an insulated wire for vehicle use 11 according to this embodiment includes a conductor 11a which includes a general-purpose material, for example, tin-coated copper or the like, and an insulating layer 11b disposed on an outer circumference of the conductor 11a. The insulating layer 11b includes a halogen-free flame retardant cross-linkable resin composition including a base polymer, and a silane coupling agent and a metal hydroxide which are added to the base polymer. The base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass. The silane-coupling agent is added in an amount of 1 to 5 parts by mass relative to 100 parts by mass of the base polymer, and the metal hydroxide is added in an amount of 100 to 250 parts by mass relative to 100 parts by mass of the base polymer.

In general, when the number of types of polymers constituting the base polymer is n (1, 2, 3 . . . k . . . n), the VA of the base polymer can be calculated from the formula (1) below:

$$(VA \text{ of base polymer}) = \sum_{k=1}^{n} X_k Y_k \quad (1)$$

In the formula (1), X represents the VA (mass %) of a polymer$_k$, Y represents the percentage of the polymer$_k$ in the entire base polymer, and k represents a natural number.

When the VA of the base polymer in the halogen-free flame retardant cross-linkable resin composition used is less than 50% by mass, the required oil resistance cannot be satisfied. When the VA exceeds 70% by mass, the low-temperature property cannot be obtained. Furthermore, when the EVA is subjected to combustion, absorption of heat due to acetic acid elimination occurs. Consequently, when the VA is low, the flame retardance tends to decrease.

Preferably, the EVA (a), which is one of the components constituting the base polymer, includes two or more types of EVAs and includes 5% to 10% by mass of an EVA having a melt flow rate (MFR) of 15 g/10 min or more. The reason for this is that by setting such ranges, the melt flow characteristic and productivity can be enhanced. That is, when the MFR is less than 15 g/10 min, the discharge rate decreases during extrusion, which may result in a decrease in productivity. When the content of the EVA having an MFR of 15 g/10 min or more is less than 5% by mass, the discharge rate decreases during extrusion, which may result in a decrease in productivity. When the content exceeds 10% by mass, adhesion becomes high at the time of melting of the resin composition, which may result in a difficulty in taking out the mixture from a batch-type kneading machine, such as a kneader. Furthermore, the VA of the EVA having an MFR of 15 g/10 min or more is not particularly limited as long as the VA of the entire base polymer is 50% to 70% by mass.

Furthermore, regarding the ratio of the content of the acid-modified olefin resin (b), which is another component constituting the base polymer, relative to the content of the ethylene-vinyl acetate copolymer (EVA) (a), when the ratio (a):(b) is higher than 70:30 to 100:0 (exceeds 30% by mass), the oil resistance decreases. Preferably, the ratio (a):(b) is 70:30 to 90:10. Furthermore, when an acid-modified polyolefin (b) having a Tg of higher than −55° C. is used, the low-temperature property degrades. The resin used as the acid-modified olefin resin having a Tg of −55° C. or lower is not particularly limited. A resin having lower crystallinity has higher flexibility. As a general guide, a resin having a melting point of 90° C. or lower is preferable. Specific examples thereof include ultralow-density polyethylene, ethylene-methyl acrylate copolymers, ethylene-ethyl acrylate copolymers, ethylene-butene-1 copolymers, ethylene-hexene-1 copolymers, and ethylene-octene-1 copolymers which have been subjected to acid modification. These polymers may be used in combination. Furthermore, by improving the adhesion with the metal hydroxide, the low-temperature property is improved. Therefore, modification with an acid is effective. Examples of the acid that can be used include maleic acid, maleic anhydride, and fumaric acid.

As long as effects are obtained, a polymer component other than the ethylene-vinyl acetate copolymer (EVA) component (a) and the acid-modified olefin resin (b) may be incorporated into the base polymer.

When the addition amount of the silane coupling agent, which is one of the additives to the base polymer, is less than 1 part by mass, the low-temperature property is degraded.

When the addition amount exceeds 5 parts by mass, adhesion to a kneading machine occurs, resulting in a decrease in workability.

Exemplarily, the silane coupling agent used in this embodiment has in its molecule a group that can react with the base polymer and an alkoxy group. The acetic acid included in the EVA acidifies the system. Consequently, hydrolysis of alkoxy groups is promoted and silanol groups are produced. Since the silanol groups chemically bond with the hydroxyl groups of the metal hydroxide by means of hydrogen bonds and dehydration and condensation reactions, adhesion with the metal hydroxide is strengthened.

Specific examples of the silane coupling agent include vinyl silane compounds, such as vinyltrimethoxysilane, vinyltriethoxysilane, and vinyl tris(β-methoxyethoxy)silane; amino silane compounds, such as γ-aminopropyltrimethoxysilane, γ-aminopropyltriethoxysilane, N-β-(aminoethyl)-γ-aminopropyltrimethoxysilane, β-(aminoethyl)-γ-aminopropylmethyldimethoxysilane, and N-phenyl-γ-aminopropyltrimethoxysilane; epoxy silane compounds, such as β-(3,4-epoxycyclohexyl)ethyltrimethoxysilane, γ-glycidoxypropyltrimethoxysilane, and γ-glycidoxypropylmethyldiethoxysilane; acrylsilane compounds, such as γ-methacryloxypropyltrimethoxysilane; polysulfide silane compounds, such as bis(3-(triethoxysilyl)propyl)disulfide and bis(3-(triethoxysilyl)propyl)tetrasulfide; mercaptosilane compounds, such as 3-mercaptopropyltrimethoxysilane and 3-mercaptopropyltriethoxysilane. Two or more of these silane compounds may be used in combination. In particular, vinyl-group-containing silane coupling agents may be used because they are capable of chemically adhering to the polymer by means of radicals generated by peroxides, electron beam irradiation, or the like and the low-temperature property is improved.

The crosslinking method used in this embodiment is not particularly limited. From the standpoint described above, radical reaction crosslinking, such as organic peroxide crosslinking or crosslinking by electron beam irradiation, may be used.

In this embodiment, when the content of the metal hydroxide, which is another additive to the base polymer, is less than 100 parts by mass, sufficient flame retardance cannot be obtained. When the content of the metal hydroxide exceeds 250 parts by mass, the low-temperature property cannot be ensured.

Examples of the metal hydroxide used in this embodiment may include aluminum hydroxide, magnesium hydroxide, and calcium hydroxide. The amount of heat absorption during decomposition of calcium hydroxide is about 1,000 J/g. The amount of heat absorption of either aluminum hydroxide or magnesium hydroxide is higher than this, at 1,500 to 1,600 J/g. Thus, aluminum hydroxide or magnesium hydroxide may be used because of better flame retardance. In view of dispersibility or the like, the flame retardant can be surface-treated with a silane coupling agent, a titanate coupling agent, a fatty acid (e.g., stearic acid), or the like.

The halogen-free flame retardant cross-linkable resin composition including the materials described above may be optionally incorporated with a crosslinking aid, a flame retardant promoter, an ultraviolet absorber, a light stabilizer, a softener, a lubricant, a coloring agent, a reinforcing agent, a surfactant, an inorganic filler, a plasticizer, a metal chelator, a foaming agent, a compatibilizing agent, a processing aid, a stabilizer, and the like.

Furthermore, in this embodiment, the insulating layer may have a single-layer structure or multilayer structure. In the case of a multilayer structure, for example, the resin composition described above is provided by extrusion coating as an outermost layer, and a polyolefin resin is provided by extrusion coating as a layer other than the outermost layer. Examples of the polyolefin resin include low-density polyethylenes, EVAs, ethylene-ethyl acrylate copolymers, ethylene-methyl acrylate copolymers, ethylene-glycidyl methacrylate copolymers, and maleic anhydride polyolefins. These may be used alone or in combination of two or more. Furthermore, optionally, a separator, a braid, or the like may be provided.

A rubber material can also be used. Examples thereof include ethylene-propylene copolymer rubber (EPR), ethylene-propylene-diene terpolymer rubber (EPDM), acrylonitrile-butadiene rubber (NBR), hydrogenated NBR (HNBR), acrylic rubber, ethylene-acrylic ester copolymer rubber, ethylene-octene copolymer rubber (EOR), ethylene-vinyl acetate copolymer rubber, ethylene-butene-1 copolymer rubber (EBR), butadiene-styrene copolymer rubber (SBR), isobutylene-isoprene copolymer rubber (IIR), block copolymer rubber having a polystyrene block, urethane rubber, and phosphazene rubber. These may be used alone or in combination of two or more.

Materials that can be used are not limited to the polyolefin resins and rubber materials described above, and any material having an insulating property can be used without particular limitations. Optionally, a flame retardant, a flame retardant promoter, a crosslinking agent, a crosslinking aid, an ultraviolet absorber, a light stabilizer, a softener, a lubricant, a coloring agent, a reinforcing agent, a surfactant, an antioxidant, an inorganic filler, a coupling agent, a plasticizer, a metal chelator, a foaming agent, a compatibilizing agent, a processing aid, a stabilizer, and the like may be added.

Crosslinking can be performed by any of the following methods: chemical crosslinking using an organic peroxide or a sulfur compound, crosslinking by irradiation with electron beams, radiation, or the like, and crosslinking using other chemical reactions.

(Cable for Vehicle Use)

FIG. 2 is a cross-sectional view of an embodiment of a cable for vehicle use according to an exemplary aspect of the present invention. As shown in FIG. 2, a cable for vehicle use according to this embodiment includes a conductor 12a, an insulating layer 12b disposed on an outer circumference of the conductor 12a, and a sheath 12c disposed on an outer circumference of the insulating layer 12b. The sheath 12c includes a halogen-free flame retardant cross-linkable resin composition containing a base polymer, and a silane coupling agent and a metal hydroxide which are added to the base polymer. The base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass. The silane-coupling agent is added in an amount of 1 to 5 parts by mass relative to 100 parts by mass of the base polymer, and the metal hydroxide is added in an amount of 100 to 250 parts by mass relative to 100 parts by mass of the base polymer.

Specifically, the cable for vehicle use 12 according to this embodiment includes the conductor 12a which includes a general-purpose material, for example, tin-coated copper or the like, the insulating layer 12b, for example, includes at least one polymer selected from the group consisting of ethylene-butene-1 copolymer rubber, polybutylene naphthalate, polybutylene terephthalate, polyphenylene oxide, and polyether ether ketone, and the sheath 12c disposed on the outer circumference of the insulating layer 12b and includes the halogen-free flame retardant cross-linkable resin composition described above.

Furthermore, in this embodiment, as in the case of the insulated wire for vehicle use, the EVA used in the base polymer of the halogen-free flame retardant cross-linkable resin composition preferably includes two or more types of EVAs and includes 5% to 10% by mass of an EVA having a melt flow rate (MFR) of 15 g/10 min or more.

Furthermore, a detailed description of the halogen-free flame retardant cross-linkable resin composition is the same as that in the case of the insulated wire for vehicle use.

Furthermore, in this embodiment, the sheath may have a single-layer structure or multilayer structure. In the case of a multilayer structure, for example, the resin composition described above is provided by extrusion coating as an outermost layer, and a polyolefin resin is provided by extrusion coating as a layer other than the outermost layer. Examples of the polyolefin resin include low-density polyethylenes, EVAs, ethylene-ethyl acrylate copolymers, ethylene-methyl acrylate copolymers, ethylene-glycidyl methacrylate copolymers, and maleic anhydride polyolefins. These may be used alone or in combination of two or more. Furthermore, optionally, a separator, a braid, or the like may be provided.

EXAMPLES

The cable for vehicle use of the exemplary aspect of the present invention will be described more specifically with reference to examples. It is to be understood that the present invention is not limited to the examples below.

Example 1

A cable for vehicle use shown in FIG. 2 was fabricated as described below. As a conductor, a tin-coated copper conductor (80/0.40 mm) was used. As an insulating layer, a resin composition included of 100 parts by mass of ethylene-butene-1 copolymer rubber (manufactured by Mitsui Chemicals, Inc., trade name: TAFMER A-4050S) and 2 parts by mass of an organic peroxide (manufactured by NOF Corporation, trade name: PEREUTYL P) was used. As a sheath, a halogen-free flame retardant cross-linkable resin composition including the materials shown in Table 1 was used. The resin compositions were provided onto the outer circumference of the conductor by two-coat simultaneous extrusion, using a 4.5-inch continuous steam crosslinking extruder, such that the thickness of the insulating layer was 0.45 mm, the thickness of the sheath was 1.67 mm, and the outer diameter was 8.60 mm. The crosslinking operation was performed for 3 minutes, using high-pressure steam of 1.8 MPa. Thereby, a cable for vehicle use was obtained.

In this case, the materials used for the halogen-free flame retardant cross-linkable resin composition constituting the sheath included 100 parts by mass of an EVA (VA: 60% by mass) (manufactured by LANXESS, trade name: LEVAPREN 600), 3 parts by mass of a silane coupling agent (vinyltrimethoxysilane, manufactured by Chisso Corp., trade name: Sila-Ace S210), 2 parts by mass of an organic peroxide (manufactured by NOF Corporation, trade name: PERBUTYL P), and 100 parts by mass of magnesium hydroxide (manufactured by Kyowa Chemical Industry Co., Ltd., trade name: KISUMA 5L).

The insulated wire for vehicle use shown in FIG. 1 can be fabricated in the same manner as that described above by using an insulating layer included of a halogen-free flame retardant cross-linkable resin composition including materials shown in Table 1 instead of the sheath in the cable for vehicle use shown in FIG. 2. Therefore, description thereof will be omitted.

The resulting cable for vehicle use was evaluated by various evaluation tests required for rolling stock use, and the evaluation results thereof are shown in Table 1.

[Evaluation Test]

(Kneading Workability)

The kneading workability was evaluated by kneading the materials for the sheath shown in Table 1 with a 25 L kneader at a preset temperature of 50° C., and increasing the temperature to 150° C. by self-heating. Then, the chamber was tilted. The mixture that fell freely was evaluated to be very good (⊙), the mixture that could be made to fall manually was evaluated to be good (○), and the mixture that could not be scooped out was evaluated to be poor (x).

(Extrusion Workability)

The extrusion workability was evaluated by performing two-coat simultaneous extrusion using a 4.5-inch continuous steam crosslinking extruder to obtain a structure of the cable for vehicle use. When the maximum take-off speed was 20 m/min or more, the extrusion workability was evaluated to be very good (⊙). When the maximum take-off speed was 1 m/min or more and less than 20 m/min, the extrusion workability was evaluated to be good (○). When taking-off was not possible, the extrusion workability was evaluated to be poor (x).

(Flame Retardance)

The flame retardance was evaluated by carrying out a vertical flame retardance test in accordance with EN60332-1-2. A 550 mm cable was held vertically, and a flame was applied for 60 seconds at a position 475 mm from the top and taken away. The case where the remaining flame was self-extinguished in the range of 50 to 540 mm from the top was evaluated to be very good (⊙). The case where the remaining flame exceeded the above range was evaluated to be poor (x).

(Oil Resistance and Low-Temperature Property of Sheath)

In order to evaluate the sheath, the insulating layer was removed by cutting, a dumbbell specimen No. 6 was cut out from the sheath portion, and the following testing was carried out.

The oil resistance was evaluated in accordance with EN60811-2-1. The specimen was immersed in a test oil IRM903 heated to 70° C. for 168 hours, and then a tensile test was carried out. The specimen with an elongation change of 40% or less was evaluated to be good (○), and the specimen with an elongation change of more than 40% was evaluated to be poor (x).

The low-temperature property was evaluated in accordance with EN60811-1-4. The specimen with an elongation of 30% or more at −40° C. was evaluated to be good (○), and the specimen with an elongation of less than 30% was evaluated to be poor (x).

(Comprehensive Evaluation)

In the comprehensive evaluation, the cable was evaluated to be very good (⊙) when all of the evaluation results were very good (⊙), the cable was evaluated to be good (○) when some of the evaluation results were good (○), and the cable was evaluated to be poor (x) when any one or more of the evaluation results were evaluated to be poor (x), i.e., "failure".

TABLE 1

Examples (Composition ratio in terms of parts by mass)

| Item | Example Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| EVA (VA: 46 mass %)[1] | | | | | 35 | 30 | 35 | 30 | 25 | 30 | 30 | 30 | 30 | 30 |
| EVA (VA: 60 mass %)[2] | 100 | | 85 | | | | | | | | | | | |
| EVA (VA: 80 mass %)[3] | | 70 | | 87 | 50 | 50 | 50 | 50 | 50 | 50 | 50 | 50 | 50 | 50 |
| EVA (VA: 46 mass %, MFR: 100 g/10 min)[4] | | | | | | | 5 | 10 | 15 | 10 | 10 | 10 | 10 | 10 |
| EVA (VA: 46 mass %, MFR: 15 g/10 min)[5] | | | | | 5 | 10 | | | | | | | | |
| Acid-modified polyolefin (Tg: −55° C.)[6] | | 30 | 15 | 13 | 10 | 10 | 10 | 10 | 10 | 10 | 10 | 10 | 10 | 10 |
| Vinyltrimethoxysilane[7] | 3 | 3 | 3 | 3 | 3 | 3 | 3 | 3 | 3 | 1 | 5 | 3 | 3 | 3 |
| Organic peroxide[8] | 2 | 2 | 2 | 2 | 2 | 2 | 2 | 2 | 2 | 2 | 2 | 2 | 2 | 2 |
| Magnesium hydroxide[9] | 100 | 100 | 100 | 100 | 100 | 100 | 100 | 100 | 100 | 100 | 100 | 250 | | |
| Aluminum hydroxide[10] | | | | | | | | | | | | | 100 | 250 |
| VA (mass %) of base polymer | 60 | 56 | 51 | 69.6 | 56.8 | 55.2 | 58.4 | 58.4 | 58.4 | 58.4 | 58.4 | 58.4 | 58.4 | 58.4 |
| Kneading workability | ⊙ | ⊙ | ⊙ | ⊙ | ⊙ | ⊙ | ⊙ | ⊙ | ○ | ⊙ | ○ | ⊙ | ⊙ | ⊙ |
| Extrusion workability | ○ | ○ | ○ | ○ | ⊙ | ⊙ | ⊙ | ⊙ | ⊙ | ⊙ | ⊙ | ○ | ⊙ | ○ |
| Flame retardance | ⊙ | ⊙ | ⊙ | ⊙ | ⊙ | ⊙ | ⊙ | ⊙ | ⊙ | ⊙ | ⊙ | ⊙ | ⊙ | ⊙ |
| Oil resistance (%) | 20 | 30 | 37 | 10 | 29 | 28 | 28 | 28 | 28 | 28 | 28 | 20 | 28 | 20 |
| Evaluation | ⊙ | ⊙ | ⊙ | ⊙ | ⊙ | ⊙ | ⊙ | ⊙ | ⊙ | ⊙ | ⊙ | ⊙ | ⊙ | ⊙ |
| Low-temperature property (%) | 50 | 60 | 57 | 32 | 48 | 45 | 42 | 42 | 42 | 34 | 45 | 35 | 40 | 32 |
| Evaluation | ⊙ | ⊙ | ⊙ | ⊙ | ⊙ | ⊙ | ⊙ | ⊙ | ⊙ | ⊙ | ⊙ | ⊙ | ⊙ | ⊙ |
| Comprehensive evaluation | ○ | ○ | ○ | ○ | ⊙ | ⊙ | ⊙ | ⊙ | ○ | ⊙ | ○ | ○ | ⊙ | ○ |

[1] Manufactured by DuPont-Mitsui, 45LX ®
[2] Manufactured by LANXESS, LEVAPREN 600 ®
[3] Manufactured by LANXESS, LEVAPREN 800 ®
[4] Manufactured by DuPont-Mitsui, 45X ®
[5] Manufactured by DuPont-Mitsui, EV550 ®
[6] Manufactured by Mitsui Chemicals, TAFMER MH5040 ®
[7] Manufactured by Chisso, Sila-Ace S210 ®
[8] Manufactured by NOF Corp., PERBUTYL P ®
[9] Manufactured by Kyowa Chemical Industry, KISUMA 5L ®
[10] Manufactured by Nippon Light Metal Company, BF013STV ®

Examples 2 to 14

Cables for vehicle use were fabricated as in Example 1 except that the materials for the sheath were changed to the ones shown in Table 1.

The resulting cables for vehicle use were evaluated by various evaluation tests, and the evaluation results thereof are shown in Table 1.

As shown in Table 1, in Examples 1 to 4, the extrusion workability was evaluated to be good (○), but all other items were evaluated to be very good (⊙). Thus, the comprehensive evaluation was good (○).

In Examples 9 and 11, the kneading workability was evaluated to be good (○), and in Examples 12 and 14, the extrusion workability was evaluated to be good (○). Thus, the comprehensive evaluation was good (○). In Examples 5 to 8, 10, and 13, all the evaluation results were very good (⊙). Thus, the comprehensive evaluation was very good (⊙).

Comparative Examples 1 to 8

Cables for vehicle use were fabricated as in Example 1 except that the materials for the sheath were changed to the ones shown in Table 2.

The resulting cables for vehicle use were evaluated by various evaluation tests, and the evaluation results thereof are shown in Table 2.

TABLE 2

Comparative Examples (Composition ratio in terms of parts by mass)

| Item | Example Comparative Examples | | | | | | | |
|---|---|---|---|---|---|---|---|---|
| | 1 | 2 | 3 | 4 | 5 | 6 | 7 | 8 |
| EVA (VA: 46 mass %) | 100 | | | | | | | |
| EVA (VA: 60 mass %) | | | | | 100 | 100 | 100 | 100 |
| EVA (VA: 80 mass %) | | 90 | 65 | 70 | | | | |
| Acid-modified polyolefin (Tg: −55° C.) | | 10 | 35 | | | | | |
| Acid-modified polyolefin (Tg: −50° C.) | | | | 30 | | | | |
| Vinyltrimethoxysilane | 3 | 3 | 3 | 3 | 3 | 3 | 0 | 6 |
| Organic peroxide | 2 | 2 | 2 | 2 | 2 | 2 | 2 | 2 |
| Magnesium hydroxide | 100 | 100 | 100 | 100 | 90 | 260 | 100 | 100 |
| VA (mass %) of base polymer | 46 | 72 | 52 | 56 | 60 | 60 | 60 | 60 |
| Kneading workability | ⊙ | ⊙ | ⊙ | ⊙ | ⊙ | ⊙ | ⊙ | X |
| Extrusion workability | ○ | ○ | ○ | ○ | ○ | ○ | ○ | ○ |
| Flame retardance | X | ⊙ | ⊙ | ⊙ | X | ⊙ | ⊙ | ⊙ |

TABLE 2-continued

Comparative Examples (Composition ratio in terms of parts by mass)

| | Example Comparative Examples | | | | | | | |
|---|---|---|---|---|---|---|---|---|
| Item | 1 | 2 | 3 | 4 | 5 | 6 | 7 | 8 |
| Oil resistance (%) | 48 | 6 | 42 | 35 | 21 | 19 | 20 | 28 |
| Evaluation | X | ⊙ | X | ⊙ | ⊙ | ⊙ | ⊙ | ⊙ |
| Low-temperature property (%) | 80 | 10 | 75 | 27 | 55 | 25 | 28 | 53 |
| Evaluation | ⊙ | X | ⊙ | X | ⊙ | X | X | ⊙ |
| Comprehensive evaluation | X | X | X | X | X | X | X | X |

As shown in Table 2, in Comparative Example 1, the VA of the base polymer was low, and the flame retardance and the oil resistance were evaluated to be poor (x). Thus, the comprehensive evaluation was poor (x).

In Comparative Example 2, the VA of the base polymer was high, and the low-temperature property was evaluated to be poor (x). Thus, the comprehensive evaluation was poor (x).

In Comparative Example 3, the addition amount of the acid-modified polyolefin was too large, and the oil resistance was evaluated to be poor (x). Thus, the comprehensive evaluation was poor (x).

In Comparative Example 4, the Tg of the acid-modified polyolefin was high, and the low-temperature property was evaluated to be poor (x). Thus, the comprehensive evaluation was poor (x).

In Comparative Example 5, the addition amount of magnesium hydroxide was small, and the flame retardance was evaluated to be poor (x). Thus, the comprehensive evaluation was poor (x).

In Comparative Example 6, the addition amount of magnesium hydroxide was large, and the low-temperature property was evaluated to be poor (x). Thus, the comprehensive evaluation was poor (x).

In Comparative Example 7, since vinyltrimethoxysilane was not added, the low-temperature property was evaluated to be poor (x). Thus, the comprehensive evaluation was poor (x).

In Comparative Example 8, since the addition amount of vinyltrimethoxysilane was large, adhesion to the inside of the kneader was strong, and it was difficult to take out the mixture. Therefore, the kneading workability was evaluated to be poor (x). Thus, the comprehensive evaluation was poor (x).

What is claimed is:

1. An insulated wire for vehicle use comprising:
a conductor; and
an insulating layer disposed on an outer circumference of the conductor, wherein the insulating layer comprises a halogen-free flame retardant cross-linkable resin composition containing a base polymer, and a silane coupling agent and a metal hydroxide which are added to the base polymer;
the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass;
the silane-coupling agent is added in an amount of 1 to 5 parts by mass relative to 100 parts by mass of the base polymer; and
the metal hydroxide is added in an amount of 100 to 250 parts by mass relative to 100 parts by mass of the base polymer, wherein the EVA includes two or more types of EVAs and includes 5% to 10% by mass of an EVA having a melt flow rate (MFR) of 15 g/10 min or more wherein the silane coupling agent includes one or more vinyl silane compounds, one or more amino silane compounds, one or more epoxy silane compounds, one or more acrylsilane compounds, one or more polysulfide silane compounds and one or more mercaptosilane compounds.

2. A cable for vehicle use comprising:
a conductor;
an insulating layer disposed on an outer circumference of the conductor; and
a sheath disposed on an outer circumference of the insulating layer, wherein the sheath comprises a halogen-free flame retardant cross-linkable resin composition containing a base polymer, and a silane coupling agent and a metal hydroxide which are added to the base polymer;
the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 100:0 and has an acetic acid content (VA) of 50% to 70% by mass;
the silane-coupling agent is added in an amount of 1 to 5 parts by mass relative to 100 parts by mass of the base polymer; and
the metal hydroxide is added in an amount of 100 to 250 parts by mass relative to 100 parts by mass of the base polymer, wherein the EVA includes two or more types of EVAs and includes 5% to 10% by mass of an EVA having a melt flow rate (MFR) of 15 g/10 min or more wherein the silane coupling agent includes one or more vinyl silane compounds, one or more amino silane compounds, one or more epoxy silane compounds, one or more acrylsilane compounds, one or more polysulfide silane compounds and one or more mercaptosilane compounds.

3. The insulated wire for vehicle use according to claim 1, wherein the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 90:10.

4. The cable for vehicle use according to claim 2, wherein the base polymer includes, as major components, (a) an ethylene-vinyl acetate copolymer (EVA) and (b) an acid-modified olefin resin having a glass transition temperature (Tg) determined by DSC of −55° C. or lower at a ratio (a):(b) of 70:30 to 90:10.

5. The insulated wire for vehicle use according to claim 1, wherein the acid-modified olefin resin includes ultralow-density polyethylene, ethylene-methyl acrylate copolymers, ethylene-ethyl acrylate copolymers, ethylene-butene-1 copolymers, ethylene-hexene-1 copolymers, and ethylene-octene-1 copolymers which have been subjected to acid modification.

6. The cable for vehicle use according to claim 2, wherein the acid-modified olefin resin includes ultralow-density polyethylene, ethylene-methyl acrylate copolymers, ethylene-ethyl acrylate copolymers, ethylene-butene-1 copolymers, ethylene-hexene-1 copolymers, and ethylene-octene-1 copolymers which have been subjected to acid modification.

7. The insulated wire for vehicle use according to claim 1, wherein the acid is a material selected from the group consisting of maleic acid, maleic anhydride, and fumaric acid.

8. The cable for vehicle use according to claim 2, wherein the acid is a material selected from the group consisting of maleic acid, maleic anhydride, and fumaric acid.

9. The insulated wire for vehicle use according to claim 1, wherein the metal hydroxide is a material selected from the group consisting of aluminum hydroxide, magnesium hydroxide, and calcium hydroxide.

10. The cable for vehicle use according to claim 2, wherein the metal hydroxide is a material selected from the group consisting of aluminum hydroxide, magnesium hydroxide, and calcium hydroxide.

11. The cable for vehicle use according to claim 2, wherein the insulating layer includes at least one polymer selected from the group consisting of ethylene-butene-1 copolymer rubber, polybutylene naphthalate, polybutylene terephthalate, polyphenylene oxide, and polyether ether ketone.

12. The insulated wire for vehicle use according to claim 1, wherein the metal hydroxide has a surface-treated agent.

13. The cable for vehicle use according to claim 2, wherein the metal hydroxide has a surface-treated agent.

14. The insulated wire for vehicle use according to claim 12, wherein the surface-treated agent includes is a material selected from the group consisting of a silane coupling agent, a titanate coupling agent and a fatty acid.

15. The cable for vehicle use according to claim 13, wherein the surface-treated agent is a material selected from the group consisting of a silane coupling agent, a titanate coupling agent and a fatty acid.

16. The insulated wire for vehicle use according to claim 1, wherein the silane-coupling agent is not a surface-treated agent for the metal hydroxide.

17. The cable for vehicle use according to claim 2, wherein the silane-coupling agent is not a surface-treated agent for the metal hydroxide.

* * * * *